(12) United States Patent
Kim et al.

(10) Patent No.: US 11,873,044 B2
(45) Date of Patent: Jan. 16, 2024

(54) PERSONAL MOBILITY DEVICE

(71) Applicants: HYUNDAI MOTOR COMPANY, Seoul (KR); KIA CORPORATION, Seoul (KR)

(72) Inventors: Soobin Kim, Seoul (KR); Rowoon An, Seoul (KR); Ilsun Song, Seongnam-si (KR); Seunghyun Woo, Seoul (KR); Jae Yul Woo, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 228 days.

(21) Appl. No.: 17/468,610

(22) Filed: Sep. 7, 2021

(65) Prior Publication Data
US 2022/0185402 A1 Jun. 16, 2022

(30) Foreign Application Priority Data
Dec. 11, 2020 (KR) .................. 10-2020-0173315

(51) Int. Cl.
*B62D 63/02* (2006.01)
*B62K 5/025* (2013.01)
*B62K 21/02* (2006.01)
*B60D 1/167* (2006.01)

(52) U.S. Cl.
CPC .......... *B62D 63/025* (2013.01); *B60D 1/167* (2013.01); *B62K 5/025* (2013.01); *B62K 21/02* (2013.01)

(58) Field of Classification Search
CPC ...... B62D 63/025; B60D 1/167; B62K 5/025; B62K 21/02; B62K 3/00; B62K 11/00; B62K 19/32; B62K 3/002; B62K 13/00; B62K 7/04; B62K 27/12; B62K 11/10; B62J 43/16; B62M 7/12
See application file for complete search history.

(56) References Cited

U.S. PATENT DOCUMENTS

| | | | | |
|---|---|---|---|---|
| 5,494,126 | A * | 2/1996 | Meeker | A61G 5/047 180/907 |
| 7,216,728 | B2 * | 5/2007 | Huang | A61G 5/1051 180/13 |
| 7,694,991 | B2 * | 4/2010 | Mills | A61G 5/10 180/11 |
| 10,407,119 | B1 * | 9/2019 | Greenberg | B62K 15/006 |
| 10,888,474 | B2 * | 1/2021 | Kim | A61G 5/047 |
| 2009/0160150 | A1 * | 6/2009 | Johnson | B62K 15/006 280/87.041 |

(Continued)

*Primary Examiner* — Kevin Hurley
*Assistant Examiner* — Marlon A Arce
(74) *Attorney, Agent, or Firm* — MCDONNELL BOEHNEN HULBERT & BERGHOFF LLP

(57) ABSTRACT

Disclosed is a personal mobility device including a towing module configured to allow various types of towed modules to be selectively connected and towed, and a connection device configured to connect the towing module and the towed modules. The connection device includes a connection member extending rearward from the towing module, a connection shaft having an upper side rotatably supported on the connection member and a lower side coupled to a shaft coupling hole formed on a connection frame of the towed module, and a locking device provided on the connection frame to lock the connection shaft.

7 Claims, 11 Drawing Sheets

(56) References Cited

U.S. PATENT DOCUMENTS

| | | | |
|---|---|---|---|
| 2012/0319373 A1* | 12/2012 | Landau | B62K 15/00 |
| | | | 280/87.041 |
| 2018/0035771 A1* | 2/2018 | Pickavance | B62K 13/08 |
| 2019/0015272 A1* | 1/2019 | Benedini | A61G 5/1051 |
| 2020/0008990 A1* | 1/2020 | Harrison | B62K 5/025 |
| 2020/0307735 A1* | 10/2020 | Paris | B62K 21/22 |
| 2022/0089244 A1* | 3/2022 | Froidevaux | B62L 3/00 |
| 2022/0135172 A1* | 5/2022 | An | B62J 1/00 |
| | | | 280/638 |

\* cited by examiner

PERSONAL MOBILITY DEVICE

CROSS-REFERENCE TO RELATED APPLICATION(S)

This application is based on and claims priority under 35 U.S.C. § 119 to Korean Patent Application No. 10-2020-0173315, filed on Dec. 11, 2020, in the Korean Intellectual Property Office, the disclosure of which is incorporated by reference herein in its entirety.

BACKGROUND

1. Field

The disclosure relates to a personal mobility device capable of being used by selectively connecting various types of towed modules to a towing module.

2. Description of the Related Art

As used throughout this patent, the phrase "personal mobility device" is intended to mean any moving personal vehicle, device, machine, instrument, apparatus, or the like. Recently, the use of a personal mobility device such as an electric kickboard is expanding. The personal mobility device may drive on roadways, sidewalks, narrow alleys, and the like by electric power.

There are various types of personal mobility device, such as electric wheels, electric kickboards, electric bicycles, and electric scooters. Therefore, a user may select a desired type of personal mobility device for purposes such as short-distance transportation means, transportation means, and leisure means.

However, such personal mobility device may be difficult to use for other purposes because the forms thereof are different depending on the uses. For example, an electric kickboard for leisure or short-distance movement may be difficult to use as a transportation means for transporting cargo.

SUMMARY

It is an aspect of the disclosure to provide a personal mobility device capable of being used by selectively connecting various types of towed modules to a towing module.

Additional aspects of the disclosure will be set forth in part in the description which follows and, in part, will be obvious from the description, or may be learned by practice of the disclosure.

In accordance with an aspect of the disclosure, a personal mobility device including a towing module configured to allow one of various types of towed modules to be selectively connected and towed, and a connection device configured to connect the towing module and the towed modules, wherein the connection device includes a connection member extending rearward from the towing module, a connection shaft having an upper side rotatably supported on the connection member and a lower side coupled to a shaft coupling hole formed on a connection frame of the towed module, and a locking device provided on the connection frame to lock the connection shaft.

The towing module may include a driving wheel, a driving motor provided to drive the driving wheel, and a battery provided to supply power to the driving motor.

The connection device may further include a lifting device installed on an upper side of the connection member to rotatably support an upper portion of the connection shaft and be configured to move the connection shaft in a vertical direction to adjust a height of the connection frame.

The lifting device may include an outer housing fixed to the upper side of the connection member, a shaft support member installed in the outer housing to be movable up and down and rotatably supporting the upper portion of the connection shaft, and a lifting driving unit installed on the outer housing to move the shaft support member in the vertical direction.

The lifting device may further include a bearing installed between an outer surface of the connection shaft and an inner surface of the shaft support member.

The locking device may include a locking pin provided on the connection frame to move forward and backward, in a direction to intersect the connection shaft, and fasten to a pin coupling hole of the connection shaft entering the shaft coupling hole, and a locking driving unit provided to move the locking pin forward and backward.

The locking driving unit may include a screw shaft screwed to the locking pin to move the locking pin forward and backward by rotation, and a motor mounted on the connection frame to rotate the screw shaft.

The connection shaft may include a first outer diameter part and a second outer diameter part having different outer diameters formed on an outer surface of the connection shaft to be selectively connected depending on a size of a shaft coupling hole of the connection frame.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the disclosure will be described in detail with reference to the accompanying drawings. The embodiments described below are provided by way of example so that those skilled in the art will be able to fully understand the spirit of the disclosure. The disclosure is not limited to the embodiments described below, but may be embodied in other forms. In order to clearly explain the disclosure, parts not related to the description are omitted from the drawings, and the width, length, thickness, etc. of the components may be exaggerated for convenience.

Figure 1:
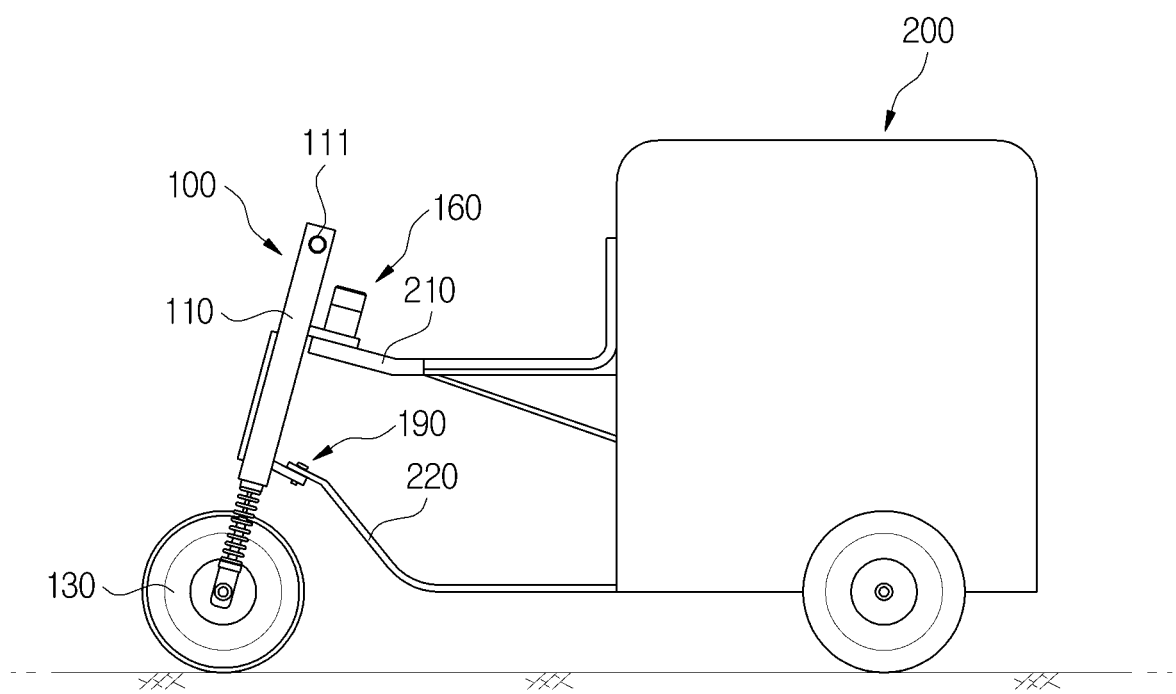
FIGS. 1 to 3 illustrate various types of personal mobility device to which the disclosure may be applied.
Figure 2:
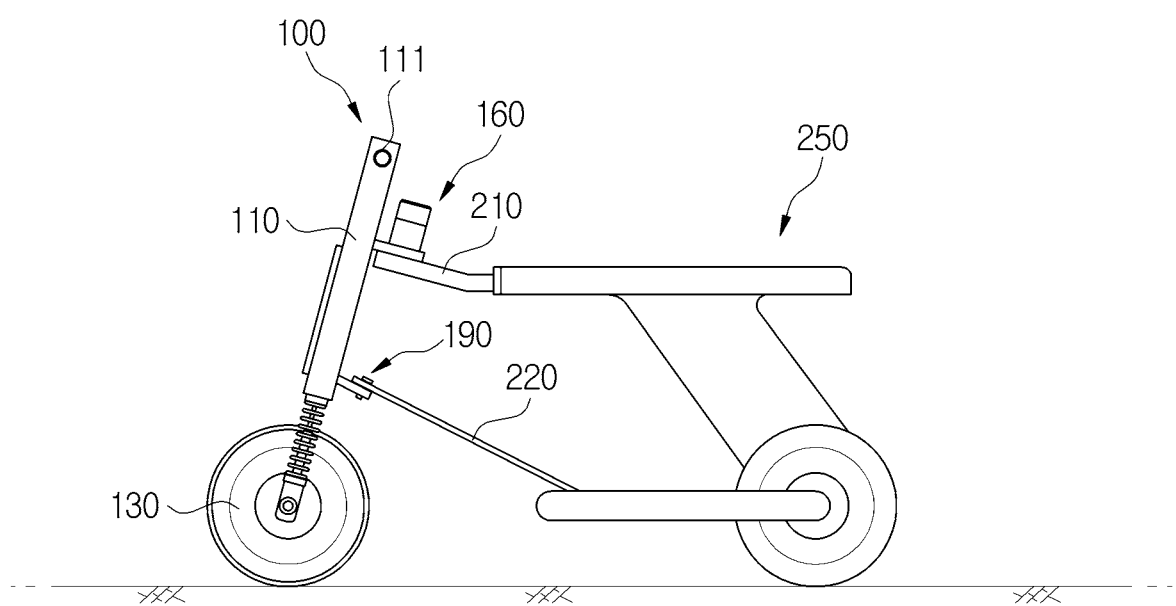
Figure 3:
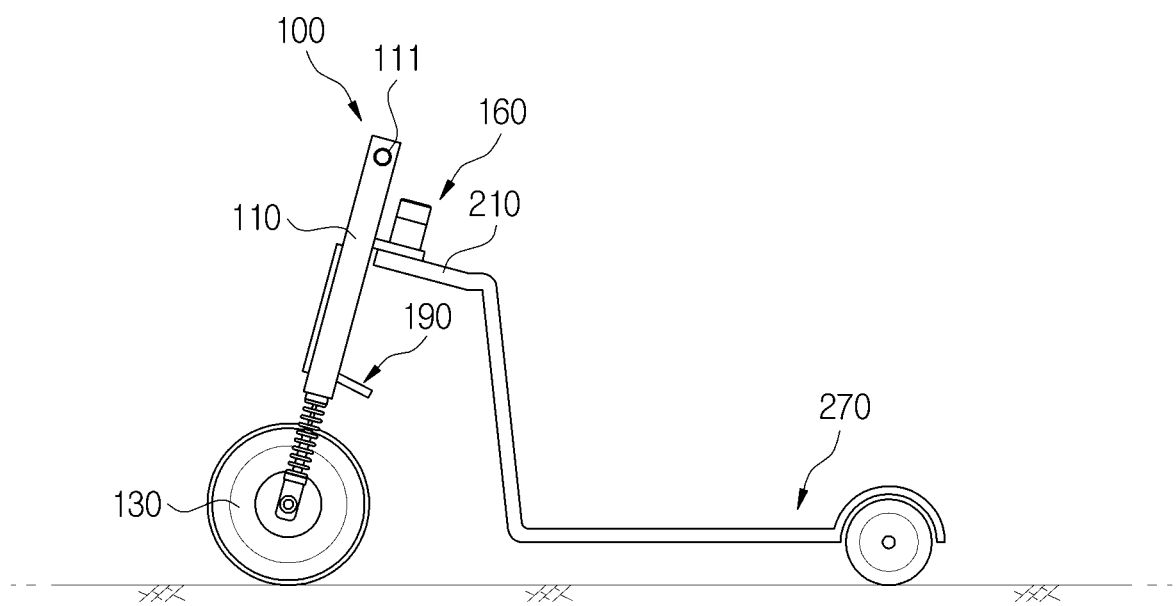

Referring to FIGS. 1 to 3, a personal mobility device to which the disclosure is applied may include a towing module 100, and various types of towed modules 200, 250, and 270 capable of being selectively connected to the towing module 100. A user may implement various types of personal mobility device by selectively connecting one of the towed modules 200, 250, and 270 to the shared towing module 100 as needed.

FIG. 1 illustrates a case in which the towed module 200 for logistics is connected to the towing module 100 to be utilized as freight transportation means, FIG. 2 illustrates a case in which the towed module 250 provided with a seat is connected to the towing module 100 to be utilized as an electric bicycle or scooter, and FIG. 3 illustrates a case in which the towed module 270 provided with a footrest is connected to the towing module 100 to be utilized as an electric kickboard. In addition, various types of towed modules may be connected to the towing module 100.

Figure 4:
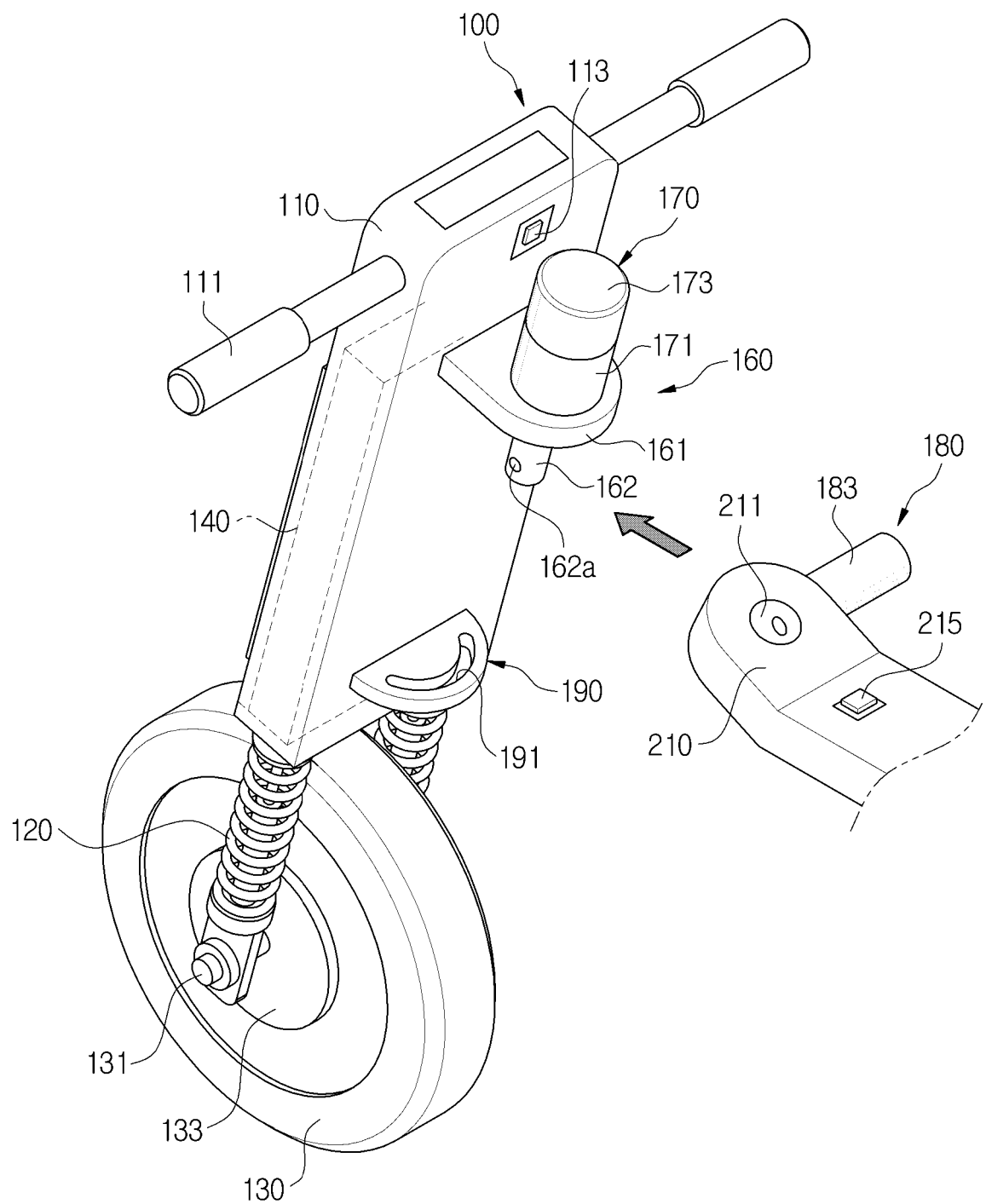
FIG. 4 is a perspective view of a towing module of a personal mobility device according to an embodiment of the disclosure.

Referring to FIG. 4, the towing module 100 may maintain a standing posture when driving by connection with the towed modules 200, 250, and 270, and may tow the towed modules 200, 250, and 270 by including driving elements.

The towing module 100 may include a body 110, suspensions 120, a driving wheel 130, a driving motor 133, a braking device (not shown), a steering handle 111, a battery 140, and a connection device 160 for selectively connecting the towed modules 200, 250, and 270.

The main body 110 may extend in a vertical direction to enable a standing driving in a state in which the towed modules 200, 250, and 270 are connected to a rear surface thereof, and may have a wider width than a thickness in a front-rear direction in order to install the battery 140 therein.

The driving wheel 130 may be installed at a lower portion of the main body 110 through the suspensions 120 on opposite sides thereof. The suspensions 120 may extend downward from opposite sides of the lower portion of the main body 110 to support a shaft 131 of the driving wheel 130. The driving motor 133 and the braking device may be installed at a central portion of the driving wheel 130. The driving wheel 130 may function as a front wheel in the personal mobility device in which the towed modules 200, 250, and 270 are connected to the towing module 100.

The steering handle 111 extends from an upper portion of the main body 110 to the opposite sides to be gripped by both hands of the user. The user may control a driving direction of the driving wheel 130 installed at the lower portion of the main body 110 by manipulating the steering handle 111 to rotate the main body 110 in a left-rear direction.

The battery 140 includes a driving motor to provide power for the operation of the personal mobility device. The battery 140 may be embedded in the main body 110 in a form that occupies most of the area of the main body 110, or may be attached to an outer surface of the main body 110 using a separate mounting means.

Figure 5:
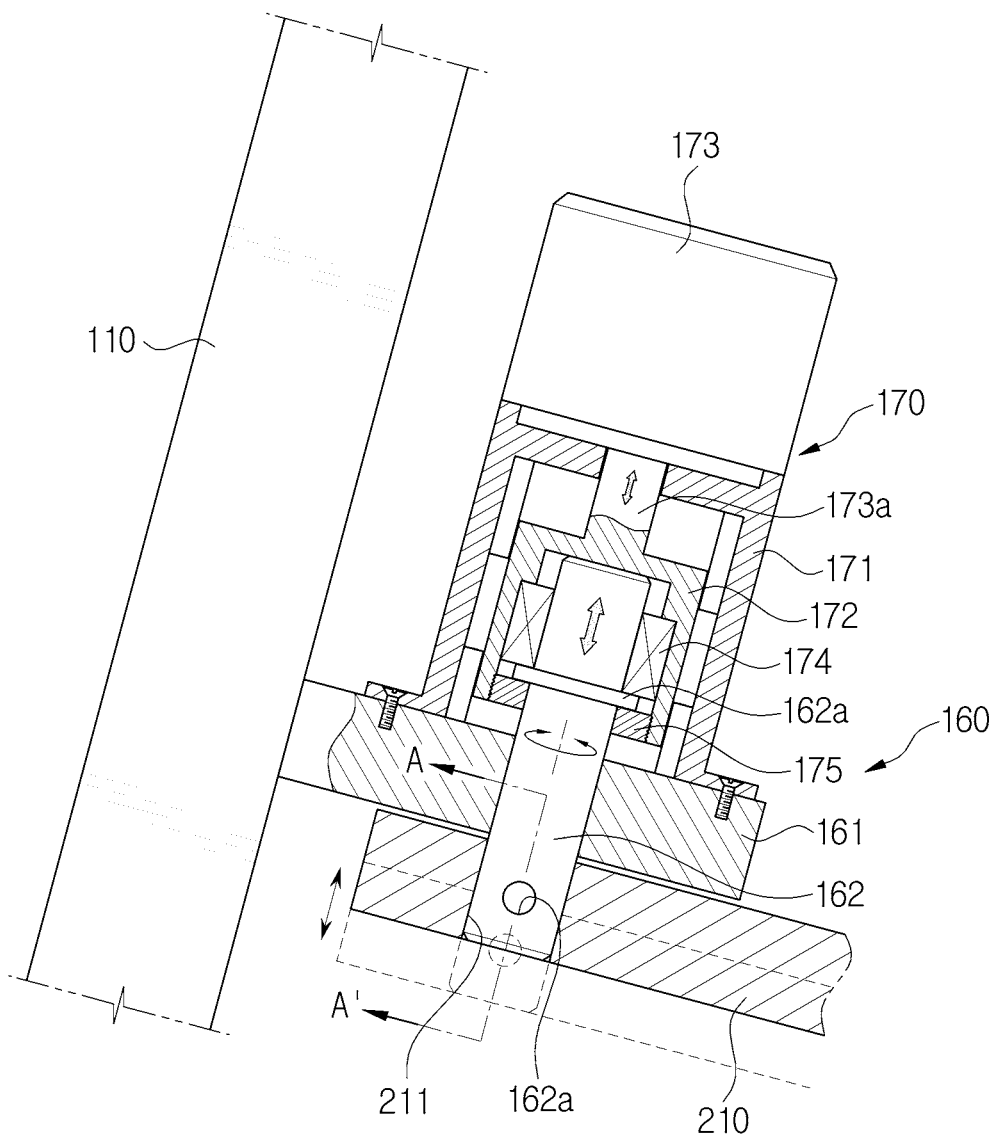
FIG. 5 a cross-sectional view of a connection device of the personal mobility device according to an embodiment of the disclosure.

As illustrated in FIGS. 4 and 5, the connection device 160 is provided on an upper side of the rear surface of the main body 110, and may rotatably connect the main body 110 to one of the towed modules 200, 250, and 270. The connection device 160 may include a connection member 161, a connection shaft 162, a lifting device 170, and a locking device 180.

The connection member 161 is fixed to the rear surface of the main body 110. The connection member 161 extends rearward from the rear surface of the main body 110 by a predetermined length to connect a connection frame 210 of the towed modules 200, 250, and 270.

The connection shaft 162 extends in the vertical direction to penetrate the connection member 161 in the vertical direction. The connection shaft 162 has an upper side rotatably supported on the connection member 161, and a lower side coupled to a shaft coupling hole 211 formed on the connection frame 210 of the towed modules 200, 250, and 270.

The lifting device 170 is installed on the upper side of the connection member 161 to rotatably support an upper portion of the connection shaft 162. The lifting device 170 may move the connection shaft 162 in the vertical direction to adjust a height of the connection frame 210 as needed.

The lifting device 170 may include a cylindrical outer housing 171 fixed to the upper side of the connection member 161, a shaft support member 172 installed in the outer housing 171 to be movable up and down and rotatably supporting the upper portion of the connection shaft 162, and an lifting driving unit 173 installed at an upper portion of the outer housing 171 to move the shaft support member 172 in the vertical direction.

The shaft support member 172 is provided in a cylindrical shape having a closed upper portion to accommodate the upper portion of the connection shaft 162. The shaft support member 172 may move up and down in the outer housing 171 in a state in which rotation is limited.

The connection shaft 162 that has entered the shaft support member 172 is rotatably supported by a bearing 174 installed between an outer surface of the connection shaft 162 and an inner surface of the shaft support member 172. A support protrusion 162a formed on the outer surface of the connection shaft 162 is supported by a support ring 175 fastened to a lower portion of the shaft support member 172. Therefore, the connection shaft 162 is ascended and descended together with the shaft support member 172, without being separated from the shaft support member 172 when the shaft support member 172 ascends and descends.

The lifting driving unit 173 is fixed to an upper side of the outer housing 171 and connected to the shaft support member 172 by a lifting rod 173a. The lifting driving unit 173 may move the connection shaft 162 up and down by moving the shaft support member 172 up and down. The lifting driving unit 173 may include a hydraulic cylinder, a motor, and the like for lifting the lifting rod 173a.

The lifting driving unit 173 may be operated as the user operates an operation member 113 (refer to FIG. 4) provided on the towing module 100. When the user wants to connect the connection frame 210 to the connection shaft 162 or to adjust the height of the connection frame 210 after the connection frame 210 is connected, the user may adjust a height of the connection shaft 162 by operating the operation member 113.

Figure 6:
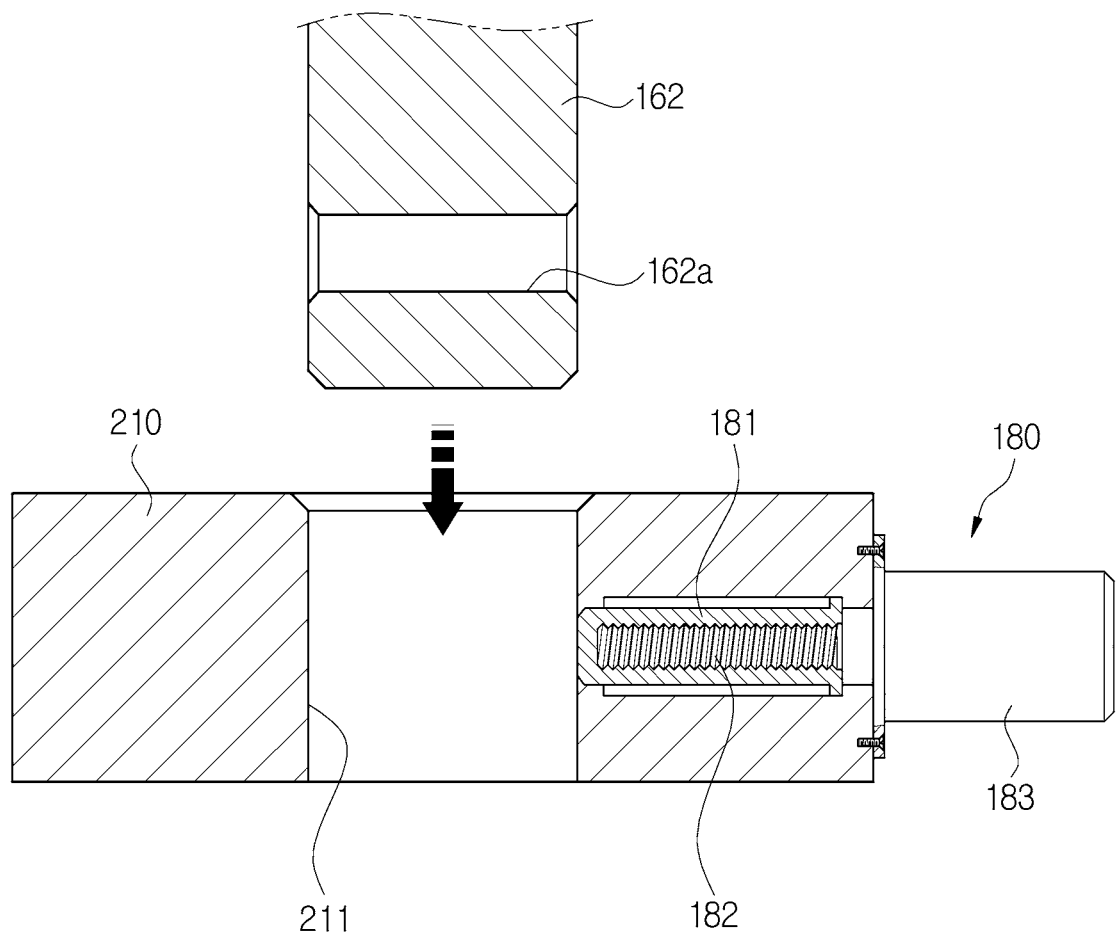
FIG. 6 is a cross-sectional view taken along line A-A' in FIG. 5, illustrating a state before a connection shaft is connected.
Figure 7:
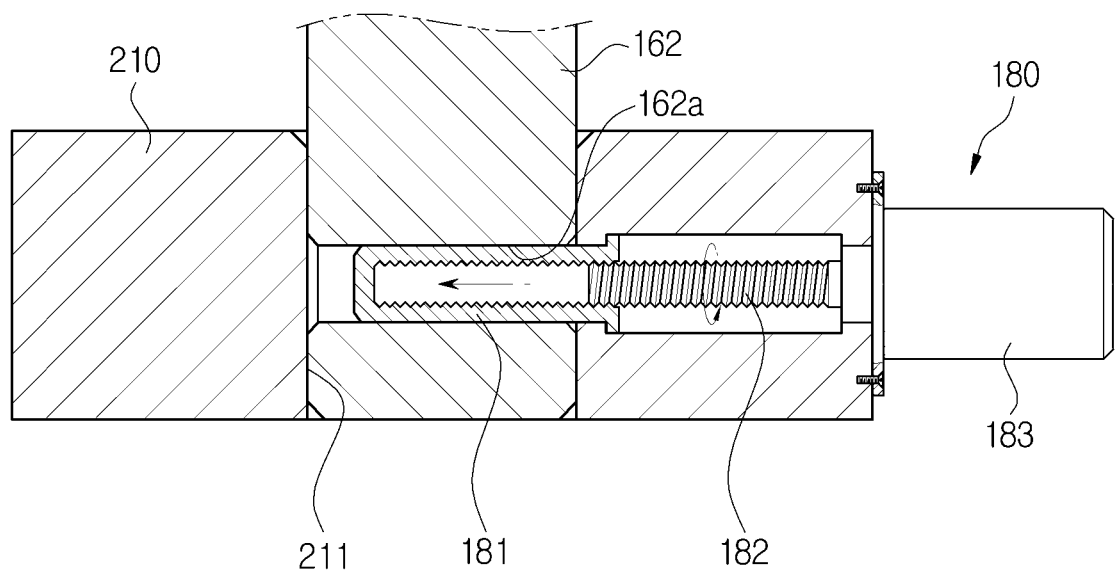
FIG. 7 is a cross-sectional view taken along line A-A' in FIG. 5, illustrating a state after the connection shaft is connected.

As illustrated in FIGS. 5 to 7, the locking device 180 may be provided in the connection frame 210 to lock the connection shaft 162 connected to the shaft coupling hole 211.

The locking device 180 includes a locking pin 181 provided on the connection frame 210 to move forward and backward in a direction of intersecting the connection shaft 162 and fastened to a pin coupling hole 162a of the connection shaft 162 entering the shaft coupling hole 211, and a locking driving unit provided to move the locking pin 181 forward and backward in a transverse direction. As illustrated in FIGS. 6 and 7, the locking driving unit includes a screw shaft 182 screwed to the locking pin 181 to move the locking pin 181 forward and backward by rotation, and a motor 183 installed on a side of the connection frame 210 to rotate the screw shaft 182 in a forward or reverse direction.

As illustrated in FIG. 6, the locking device 180 maintains a state in which the locking pin 181 moves backward toward the motor 183 before the connection shaft 162 enters the shaft coupling hole 211. Accordingly, the connection shaft 162 may enter the shaft coupling hole 211. As illustrated in FIG. 7, after the connection shaft 162 enters the shaft coupling hole 211, the locking pin 181 enters the pin coupling hole 162a of the connection shaft 162 by the operation of the motor 183, so that the connection shaft 162 may be locked to the connection frame 210.

When the user wants to connect or disconnect the connection frame 210 to the connection shaft 162, the user may operate the locking device 180 by operating an operation member 215 (refer to FIG. 4) provided in the connection frame 210.

Figure 8:
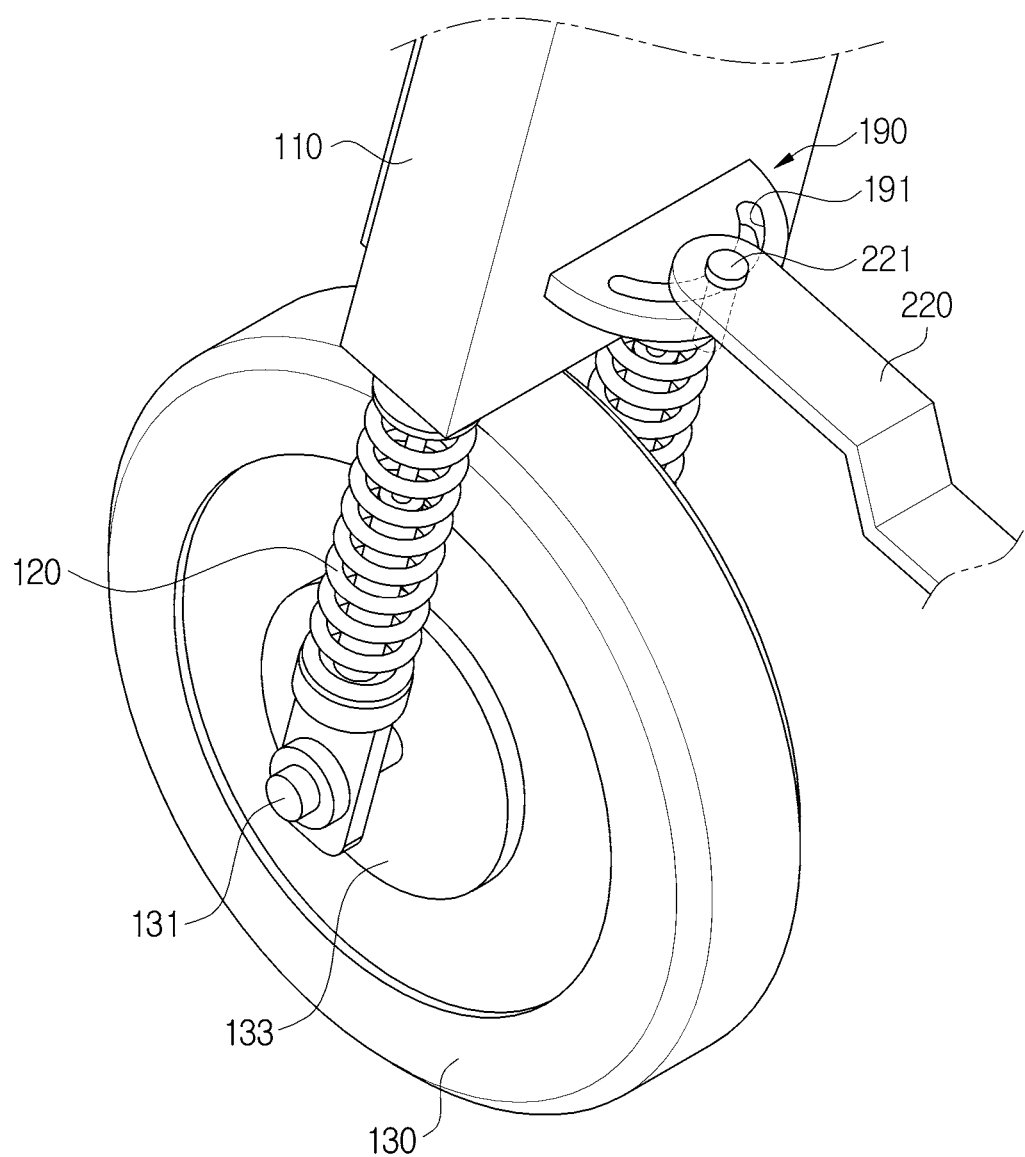
FIG. 8 is a perspective view illustrating an auxiliary connection device of the personal mobility device according to an embodiment of the disclosure.

Referring to FIGS. 4 and 8, on the rear surface of the main body 110 of the towing module 100, an auxiliary connection device 190 may be provided at a position spaced downward from the connection device 160.

The auxiliary connection device 190 is fixed to the rear surface of the main body 110 and may be a semicircular plate extending backward from the rear surface of the main body 110. When the auxiliary connection device 190 includes a lower connection frame 220, like the towed module 200 for freight transportation of FIG. 1 or the electric bicycle of FIG. 2, the lower connection frame 220 may be used to be connected to the towing module 100.

The auxiliary connection device 190 has a semicircular pin coupling groove 191 whose center of curvature coincides with a center of the connection shaft 162 of the connection device 160. The lower connection frame 220 may be connected to the auxiliary connection device 190 by coupling a lower connection pin 221 to the semicircular pin coupling groove 191. The semicircular pin coupling groove 191 enables smooth steering of the towing module 100 because the center of curvature thereof coincides with the center of the connection shaft 162.

As such, the personal mobility device of this embodiment includes the connection device 160 for connecting or disconnecting the towing module 100 and the towed module 200, 250, and 270, one of various types of the towed modules 200, 250, and 270 may be selectively connected to or disconnected from the towing module 100 as needed.

Because the personal mobility device of this embodiment is configured such that one of various types of towed modules 200, 250, and 270 may be selectively connected to the towing module 100 including driving elements such as the driving motor 133, the braking device, and the battery 140, the form of the personal mobility device may be variously changed depending on the purpose of use. In addition, because there is no need to install any driving element in the towed modules 200, 250, and 270, various types of towed modules 200, 250, and 270 may be manufactured at low cost.

Figure 9:
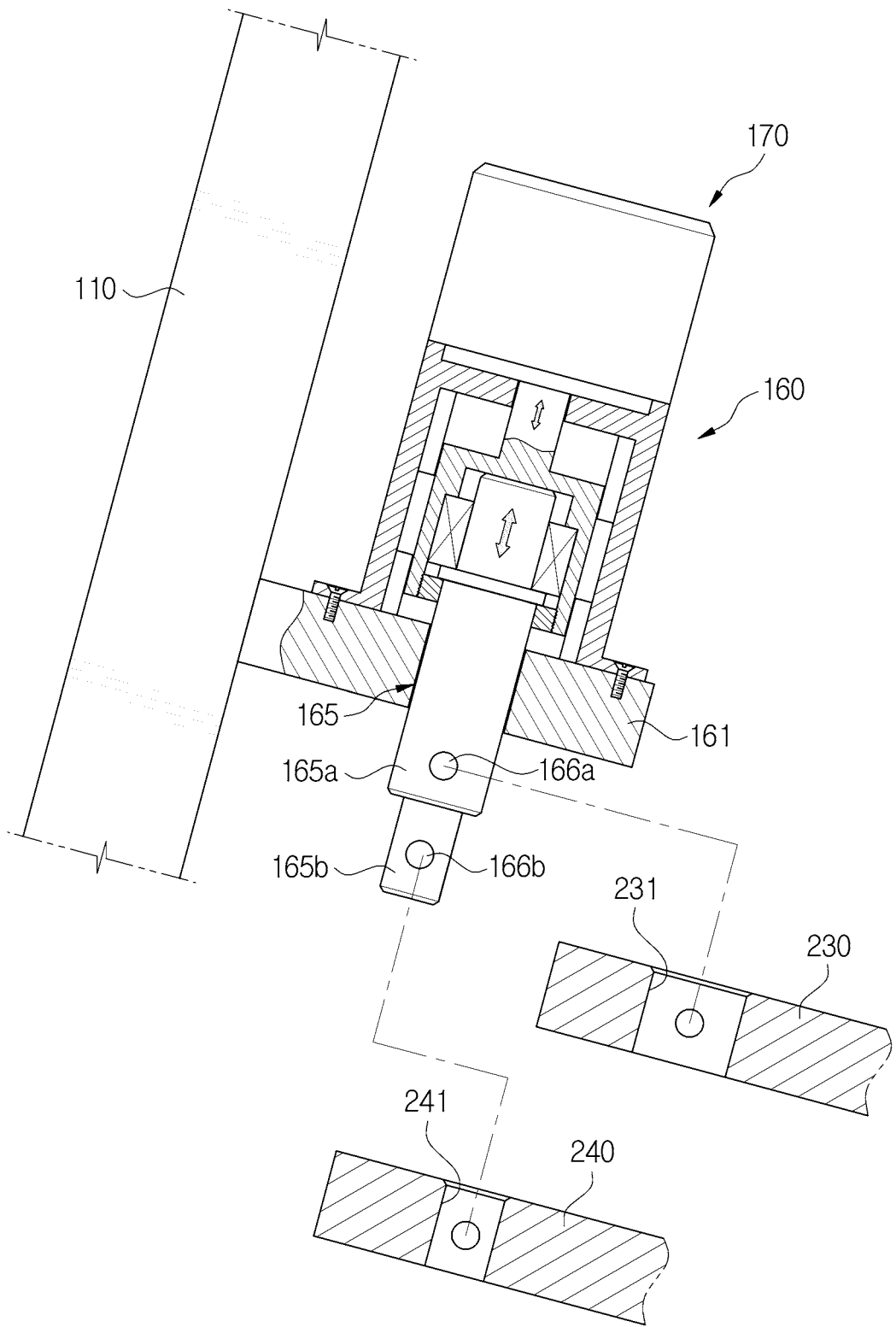
FIG. 9 illustrates a modified example of a connection shaft of the connection device of the personal mobility device according to an embodiment of the disclosure.
Figure 10:
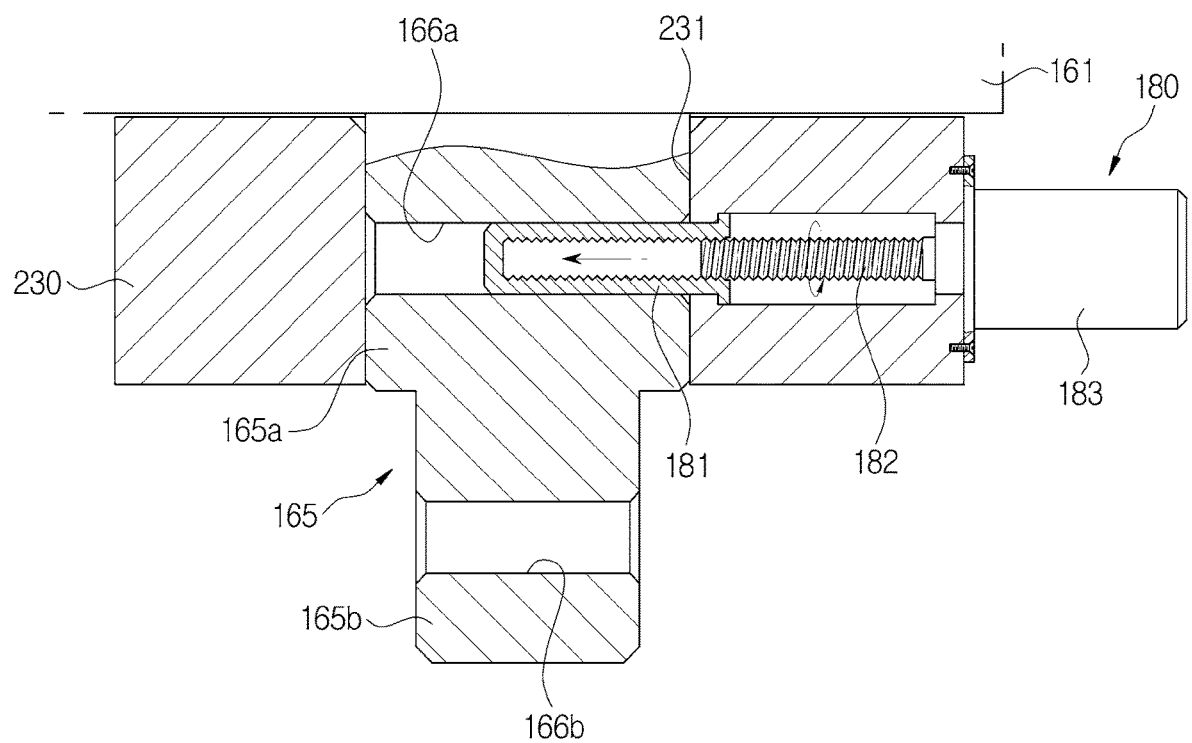
FIG. 10 illustrates a state in which a connection frame is connected to a first outer diameter part of the connection shaft in the example of FIG. 9.
Figure 11:
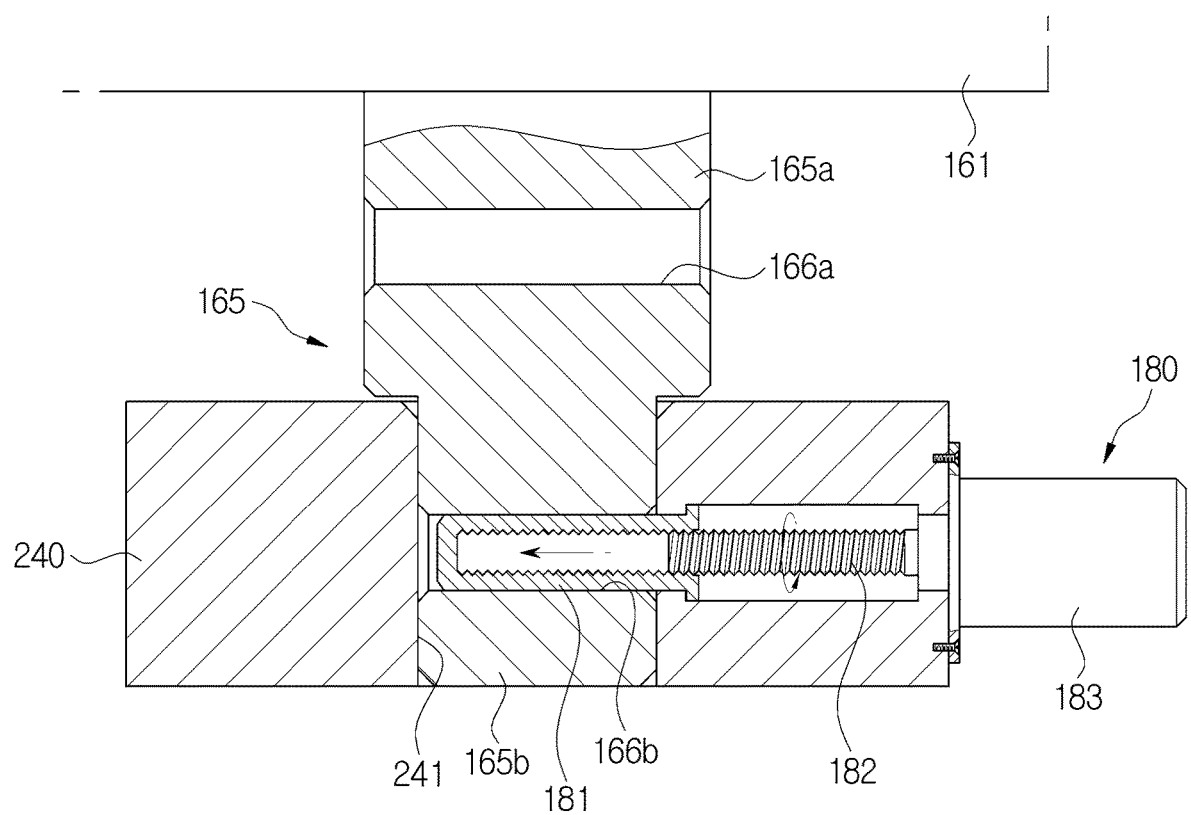
FIG. 11 illustrates a state in which the connection frame is connected to a second outer diameter part of the connection shaft in the example of FIG. 9.

FIGS. 9 to 11 illustrate a modified example of the connection shaft of the connection device. In the example of FIG. 9, a connection shaft 165 of the connection device 160 includes a first outer diameter part 165a and a second outer diameter part 165b having different outer diameters formed on an outer surface of the connection shaft 165, below the connection member 161, to be selectively connected to shaft coupling holes 231 and 241 which are formed on parts 230 and 240, depending on the size thereof.

The first outer diameter part 165a is formed larger than the second outer diameter part 165b so that the connection frame 230 of a relatively bulky and heavy towed module can be connected. Therefore, the user may connect the relatively large towed module 200, as in the example of FIG. 1, to the first outer diameter part 165a, and may connect the relatively small towed module 270, as in the example of FIG. 3, to the second outer diameter part 165b.

FIG. 10 illustrates a case in which the connection frame 230 in which the relatively large shaft coupling hole 231 is formed is connected to the first outer diameter part 165a of the connection shaft 165, and FIG. 11 illustrates a case in which the connection frame 240 in which the relatively small shaft coupling hole 241 is formed is connected to the second outer diameter part 165b of the connection shaft 165. The first outer diameter part 165a and the second outer diameter part 165b are provided with pin coupling holes 166a and 166b, respectively, to which the locking pin 181 of the locking device 180 provided on each of the parts to be connected 230 and 240 is coupled.

As such, because the connection shaft 165 of the connection device 160 in FIG. 9 includes the first outer diameter part 165a and the second outer diameter part 165b having different outer diameters, the connection frame parts 230 and 240 having the shaft coupling holes 231 and 241 having different sizes, respectively, may be selectively connected to the first outer diameter part 165a and the second outer diameter part 165b as needed.

As is apparent from the above, because a personal mobility device according to an embodiment of the disclosure includes a connection device configured to connect or disconnect a towing module and towed modules, one of various types of the towed modules can be easily connected to or disconnected from the towing module as needed.

Further, because the personal mobility device according to an embodiment of the disclosure is configured such that one of various types of the towed modules can be selectively connected to the towing module including driving elements such as a driving motor, a braking device, and a battery, the form of the personal mobility device can be variously changed depending on the purpose of use. In addition, because there is no need to install any driving element in the towed modules, various types of towed modules can be manufactured at low cost.

While the disclosure has been described in connection with certain embodiments, it will be understood that it is not intended to limit the invention to those particular embodiments. On the contrary, it is intended to cover all alternatives modifications, and equivalents included within the spirit and scope of the disclosure as defined by the appended claims.

What is claimed is:

1. A personal mobility device comprising:
   a towing module configured to allow one of various types of towed modules to be selectively connected and towed; and
   a connection device configured to connect the towing module and the towed modules,
   wherein the connection device comprises:
   a connection member extending rearward from the towing module;
   a connection shaft having an upper side rotatably supported on the connection member and a lower side coupled to a shaft coupling hole formed on a connection frame of the towed module; and a locking device provided on the connection frame to lock the connection shaft; and wherein the connection device further comprises a lifting device installed on an upper side of the connection member to rotatably support the connection shaft and configured to move the connection shaft in a vertical direction to adjust a height of the connection frame.

2. The personal mobility device according to claim 1, wherein the towing module comprises:

a driving wheel;

a driving motor provided to drive the driving wheel; and a battery provided to supply power to the driving motor.

3. The personal mobility device according to claim 1, wherein the lifting device comprises:

an outer housing fixed to the upper side of the connection member;

a shaft support member installed in the outer housing to be movable up and down and rotatably supporting the upper portion of the connection shaft; and a lifting driving unit installed on the outer housing to move the shaft support member in the vertical direction.

4. The personal mobility device according to claim 3, wherein the lifting device further comprises a bearing installed between an outer surface of the connection shaft and an inner surface of the shaft support member.

5. The personal mobility device comprising:

a towing module configured to allow one of various types of towed modules to be selectively connected and towed; and a connection device configured to connect the towing module and the towed modules, wherein the connection device comprises:

a connection member extending rearward from the towing module;

a connection shaft having an upper side rotatably supported on the connection member and a lower side coupled to a shaft coupling hole formed on a connection frame of the towed module;

a locking device provided on the connection frame to lock the connection shaft; and the locking device comprises:

a locking pin provided on the connection frame to move forward and backward in a direction of intersecting the connection shaft and fastened to a pin coupling hole of the connection shaft entering the shaft coupling hole; and a locking driving unit provided to move the locking pin forward and backward.

6. The personal mobility device according to claim 5, wherein the locking driving unit comprises:

a screw shaft screwed to the locking pin to move the locking pin forward and backward by rotation; and a motor mounted on the connection frame to rotate the screw shaft.

7. A personal mobility device comprising:

a towing module configured to allow one of various types of towed modules to be selectively connected and towed; and a connection device configured to connect the towing module and the towed modules;

wherein the connection device comprises:

a connection member extending rearward from the towing module;

a connection shaft having an upper side rotatably supported on the connection member and a lower side coupled to a shaft coupling hole formed on a connection frame of the towed module;

a locking device provided on the connection frame to lock the connection shaft; and wherein the connection shaft comprises a first outer diameter part and a second outer diameter part having different outer diameters formed on an outer surface of the connection shaft to be selectively connected depending on a size of a shaft coupling hole of the connection frame.

* * * * *